United States Patent [19]

Nagamine

[11] 4,114,522

[45] Sep. 19, 1978

[54] METHOD AND APPARATUS FOR AUTOMATICALLY DETECTING AND CONTROLLING THE DEGREE OF CARAMELIZATION OF CANDIES

[75] Inventor: Kazuaki Nagamine, Mishima, Japan
[73] Assignee: Morinaga & Co., Ltd., Japan
[21] Appl. No.: 811,132
[22] Filed: Jun. 28, 1977
[30] Foreign Application Priority Data
  Jul. 19, 1976 [JP] Japan .................... 51-85790
[51] Int. Cl.² .............................. A47J 37/10
[52] U.S. Cl. ...................... 99/348; 366/153
[58] Field of Search ............... 99/342, 348; 366/140, 366/142, 151, 153; 426/572, 231

[56] References Cited
U.S. PATENT DOCUMENTS
2,753,158 7/1956 Rebechini ............... 99/348
3,739,711 6/1973 Nieblach ............... 99/348

Primary Examiner—Leonard D. Christian
Attorney, Agent, or Firm—McGlew and Tuttle

[57] ABSTRACT

The present invention relates to a novel method and apparatus for automatically detecting and controlling the degree of caramelization of candies, which provides a detector for continuously detecting the degree of caramelization of caramelized liquid which is connected to a control unit for automatically adjusting the increase or decrease in the degree of caramelization to maintain it at a predetermined control limit. The control unit further includes a pump for continuously feeding a treatment tank with the liquid caramelized to a constant state and a feature for simultaneously keeping the degree of caramelization at a constant when the automatic changes in the quantity of caramelized liquid, due to variations of operating conditions in subsequent processes, occur.

5 Claims, 3 Drawing Figures

METHOD AND APPARATUS FOR AUTOMATICALLY DETECTING AND CONTROLLING THE DEGREE OF CARAMELIZATION OF CANDIES

BACKGROUND OF THE INVENTION

1. Field of the Invention

This invention relates in general to a method and device for controlling the degree of caramelization of liquids in the making of candy products, and in particular to a new and useful method and apparatus for sensing a degree of caramelization of caramelized liquid in a caramelization tank and controlling the degree of caramelization by varying the level of the liquid in the caramelization tank which is controlled by stirring the liquid and feeding the liquid to subsequent processing tanks at selected rates.

Conventionally, the continuous production of candies has required a great deal of skill in keeping the liquid at a constant degree of caramelization, because the work depends on a manual operation in which an operator has to judge with his naked eye, and therefore with his limited discriminating ability, the increase and decrease of the degree of caramelization by always watching the change in color of the caramelized liquid, and manually adjust each regulator for example, the steam pressure in the caramelizing tank.

The operating conditions in the processes subsequent to the caramelizing process are variable according to the quantity of products to be produced or according to other variable conditions existent during the course of the continuous production. Because of this it becomes necessary to change the rate of feedng the liquid to be caramelized each time a variation occurs, and to control the caramelization so as to keep the degree thereof at a contant state despite such changes in the rate of feeding.

2. Summary of the Invention

The present invention avoids the difficulties and limitations of the prior method of controlling the caramelization of liquids by providing a detector that accurately responds to the color of the liquid after it has undergone a caramelization process, to determine the degree of caramelization which is directly related to this color. The caramelization takes place in a heated caramelization tank which is provided with a stirring device for stirring the liquid, a pumping device for removing liquid from the tank and supplying it to a cooling tank at which the prior mentioned detector senses the color of the liquid, and a level sensing device in the caramelization tank for sensing the level of the liquid therein.

The detector and level sensing device feed signals to a caramelization control unit which changes the degree of caramelization in the liquid leaving the caramelization tank to bring it to a desired degree, by changing the level of liquid in the tank which can be controlled by varying the speed of the stirring and pumping devices in the caramelization tank.

Accordingly the main object of the present invention is to automatically control the degree of caramelization of liquid used for candies so that it will always be kept at an optimum condition, by automatically detecting this degree.

Another object of the invention is to automatically regulate the liquid level in a caramelizing tank through the process of an automatic caramelization control, and thus to keep the quantity of the liquid fed from the caramelizing tank at a constant level.

The various featues of novelty which characterize the invention are pointed out with particularity in the claims annexed to and forming a part of this disclosure. For a better understanding of the invention, its operating advantages and specific objects attained by its uses, reference should be had to the accompanying drawings and the detailed descriptions in which there are illustrated preferred embodiments of the invention.

DESCRIPTION OF THE PREFERRED EMBODIMENTS

Figure 1:
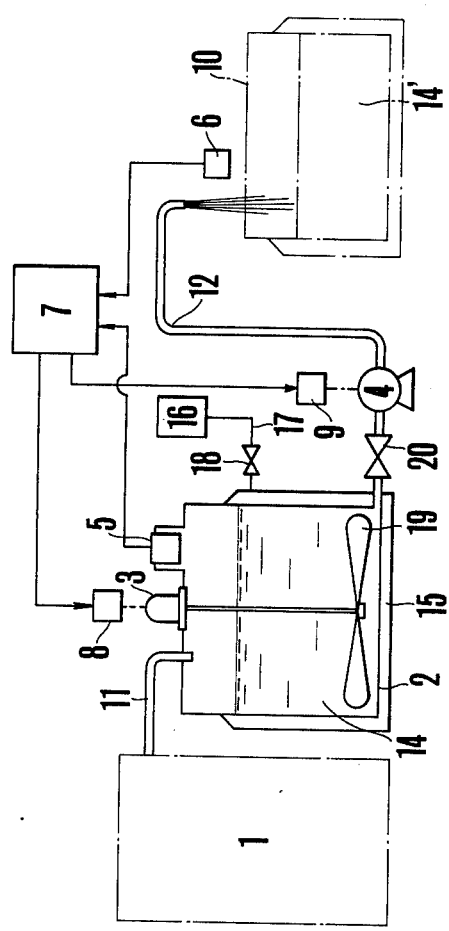
FIG. 1 is a schematic view showing the method and apparatus for controlling the degree of caramelization, of the present invention.

Referring to the drawings in particular, the invention embodied therein comprises in FIG. 1, a cooker 1 for boiling down the materials for candies which feeds boiled down liquid 14 to a caramelizing tank 2 by passing it through a pipe 11. The liquid 14 is heated by the steam sent from a steam tank 16 through a pipe 17 and a valve 18 to a jacket 15 of the caramelizing tank 2. Simultaneously the liquid 14 is stirred and caramelized by means of a stirring device or paddle 19 which is rotated by a motor 3. A caramelized liquid 14', thus treated, is fed to a cooling tank 10, through valve 20 and pipe 12 connected through a pump 4. In this apparatus and process, it is desirable to provide a means for automatically controlling the degree of caramelization and regulating the quantity of the liquid to be fed from the caramelizing tank.

A preliminary step in the automatic control of the degree of caramelization is the detecting of this degree using a suitable detector. To this end, a detector 6 is disposed over the cooling tank 10, for sensing the color of the caramelized liquid 14'.

The boiled down liquid 14 for use in making candies, has a constant composition of materials, but vary in its chroma of color with its degree of caramelization. In order to accurately detect the degree of such changes in color during the continuous caramelizing process, it is necessary to provide a detector which will not be affected by variations such as the deterioration of a light source or clouding of a light-receiver section in the detector.

Figure 2:
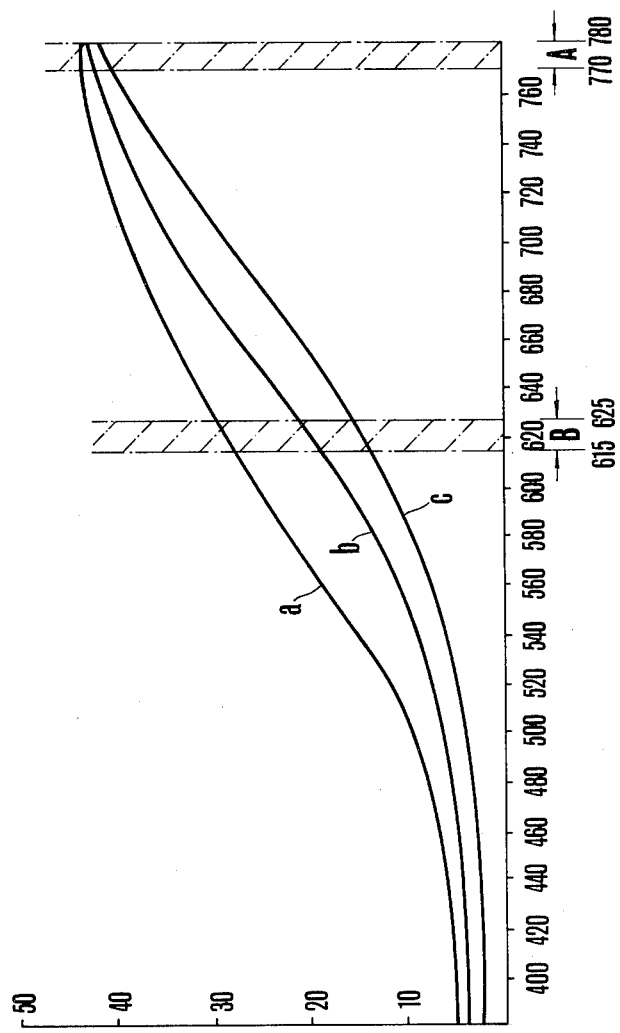
FIG. 2 is a graphic representation showing the reflection spectra of liquids fed from a caramelizing tank for control of the caramelization, with wavelength (in nm) on the abscissa and reflectivity (in %) on the ordinate.

When the natural product, such as raw material for candies, is processed by heating, the changes in color which depend on the degree of caramelization can be converted to a continuous reflection spectrum over the whole visible range as shown by the curves in FIG. 2. The three curves in FIG. 2 refer to the spectra of the reflected rays from the caramelized liquid of a certain kind of caramel. The spectral curves represent the spectra of the reflected rays from the liquid, with curve b representing the liquid being optimally caramelized, curve a representing a lower degree of caramelization and therefore being lightest in color within the range allowable for control of the caramelization and with curve c representing a high degree of caramelization and being the darkest in color within the range allowable. When the value for reflectivity in the spectral band B (615–625 nm), selected at a substantially central portion of the visible region, is mathematically divided by the value for reflectivity in the spectral band A (770–780 nm), selected at the longest wavelength, for each continuous spectral curve $a$, $b$ and $c$, the respective values are found to be about 0.72, 0.46, and 0.36. For example, in curve $b$, the reflectivity of the liquid in band B is about 19% as seen in FIG. 2. The reflectivity in band A is about 41% and dividing 19 by 41 yields about 0.46. It will be noted that these values will not vary due to internal variations of the detector and are a function of the characteristic spectrum of the caramelized liquid.

The use of this type of detector is particularly suited to the invention as it has the ability to discriminate between values with differences as small as 0.01. Using the same scale, a human operator using his eyes alone can see differences of about 0.06 to 0.10.

Thus, such detector is far more sensitive than the operator. Accordingly, if the width between the upper limit value and the lower limit value for caramelization (reflectivity on B)/(reflectivity on A) is set narrower, this will make it possible to carry out the detection far more accurately compared with the detection by the conventional method. It should be noted, however, that it will be necessary to change the selection of the spectral band B, as well as the upper limit value and the lower limit value of (reflectivity on B)/(reflectivity on A) depending upon the kinds of candy processed.

Figure 3:
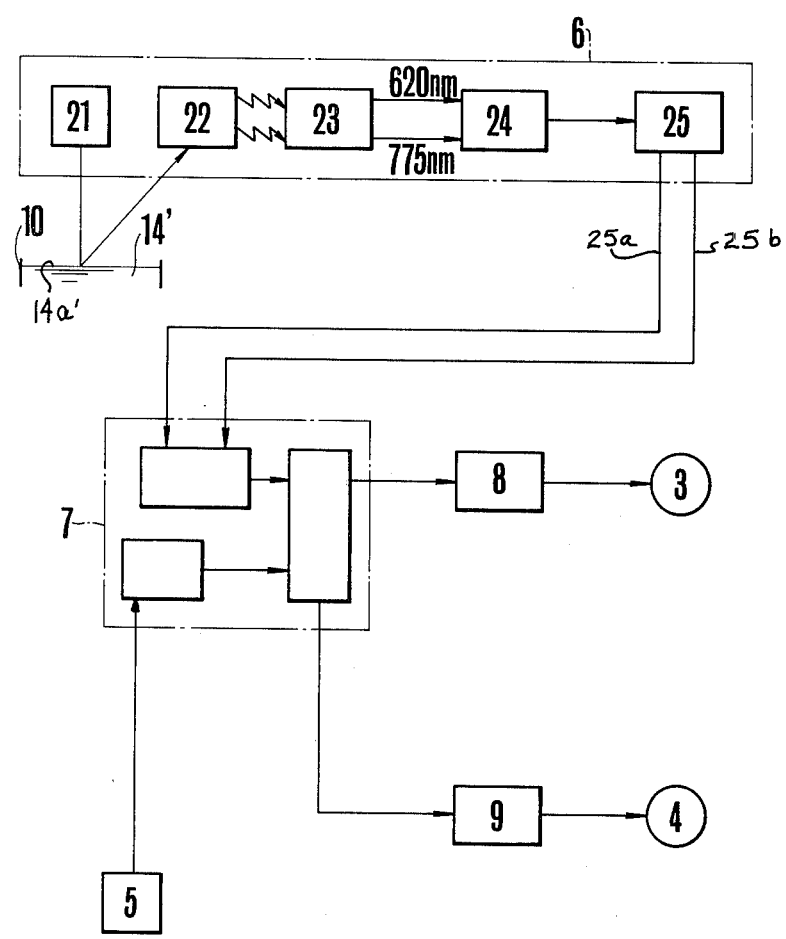
FIG. 3 is a block diagram of a control means.

Referring to FIG. 3 the detector 6 comprises a light source 21 which shines light onto the surface 14$a'$ of the caramelized liquid 14' in the cooling tank 10. This light is reflected from the surface 14$a'$ and enters a spectral divider 22 which divides the light into a reflection spectrum and filters out all the light except that within the light bands between 615 and 625 nm (band B of FIG. 2) and between 770 and 780 nm (band A of FIG. 2). The light from these bands is directed into a photoelectric converter 23 which converts the light into two electric signals that are fed into calculator circuit 24. The circuit 24 performs the mathematical operation of dividing the value of light from band B by that of band A. The resulting value is fed to a comparator 25 in an electric signal.

The comparator 25 then produces an electric signal for use in the control of the three cases of set values, i.e. the upper limit value for the control set at a point lower than the upper limit value within the control limit for caramelization; the lower limit value for the control set at a point higher than the lower limit value within the control limit; and the optimal value for control between the upper limit value and the lower limit value. These signals are used as the input signals for a caramelizing controller 7 which receives these signals and further transmit control signals for controlling the degree of caramelization as will be described in detail below. The controller 7 also receives and transmits signals for regulating the quantity of the liquid in the caramelizing tank 2 as will be described later.

The boiled-down liquid 14 which is fed from the cooker 1 into the caramelizing tank 2 is heated by the steam entering the tank jacket 15, while being stirred with the stirring device 19 disposed within the caramelizing tank 2, and is further fed by pump 4, after being caramelized, to the cooling tank 10.

In order to automatically control the degree of caramelization of this caramelized liquid, the color of the caramelized liquid 14' in the cooling tank 10 is continuously detected with the caramelizing detector 6. The detector 6 is connected to control unit 7 and is set to send a control signal through lines 25$a$ or 25$b$ when the caramelization goes above or falls below a selected limit. Such a limit can be chosen for one of the aforementioned desired degrees of caramelization. Control unit 7 further sends a control signal to a motor speed controller 8 which is connected to the stirring motor 3 of the stirring device 19. The degree of caramelization can be controlled by increasing and decreasing the stirring speed as determined by the signals from the detector.

In case where the color of the caramelized liquid 14' fed into the cooling tank 10 is too dark because of over-carmelization, the stirring device 18 is accelerated for quickening discharge to the atmosphere of air-bubbles mixed in the boiled-down liquid 14 which were introduced when it is fed into the caramelizing tank 2. This lowers the liquid level in the caramelizing tank 2, resulting in a decrease in the contacting area between the inner wall of caramelizing tank 2 and the boiled-down liquid 14. In this case, with the increase of rotational speed of the stirring device 19, there is a slight rise in the liquid level along the cicumferential wall of the caramelizing device due to turbulence.

This effect increases heat transfer but is far smaller than the effect of lowering it by the decrease of the contacting area, causing the decrease in the quantity of heat transferred to the boiled-down liquid, whereby the overall degree of caramelization is decreased. This makes the color of the caramelized liquid 14' to be fed into the cooling tank 10, lighter.

In case the color of caramelized liquid 14' fed into the cooling tank 10 is too light, on the other hand, reducing the stirring speed of the stirring device 19 causes the rise of the liquid level of the caramelizing tank 2, whereby the degree of caramelization is increased, resulting in making the color of the caramelized liquid 14' to be fed into the cooling tank 10, darker.

The quantity of the boiled-down liquid 14 fed from the cooker 1 into the caramelizing tank 2 will have to be changed depending upon variations caused by the change of conditions in the processes subsequent to the cooling tank 10. In this case, in order to keep the liquid level of caramelizing tank 2 constant, a level gauge 5 is provided above tank 2 which detects the deviation of the liquid level caused by the rise or fall, and the deviation signals thereby obtained are inputted into the caramelizing controller 7 which, according to the input signals, outputs the speed-setting signals to a revolution speed controller 9 of the pump 4, so that the pump may be accelerated at a time when the liquid level rises and so that the same may be decelerated at a time when the liquid level falls. Thus, the liquid level of the caramelizing tank 2 can be kept constant at all times.

The liquid level of the caramelizing tank 2 however, also rises or falls depending on the automatic control of the degree of caramelization. Therefore, the liquid levels rising and falling as the result of the automatic control of the degree of caramelization have to be used as the required levels of the liquid for automatically regulating the quantity of the caramelized liquid 14' to be fed out of the caramelizing tank 2 following the changes in the quantity of boiled-down liquid 14 fed into the caramelizing tank 2. As a result of the automatic control of the degree of caramelization, depending in each case on the color of the caramelized liquid 14' being either too dark, within the desirable range for control, or too light;

the liquid levels in the caramelizing tank 2 are moved to a low level, a medium level, or a high level, respectively. These levels are used as the required levels of the liquid in each case, and the caramelizing controller 7 is provided with a function capable of outputting signals for regulating the quantity of the caramelized liquid to be fed out of the caramelizing tank 2 depending on the changes of the quantity of the liquid fed into the tank 2 so that the required level may be maintained.

As mentioned above, by combining the caramelizing tank 2, stirring device 19, and pump 4 with the automatic controlling means such as level gauge 5, caramelizing detector 6, caramelizing controller 7, revolution speed controller 8 of motor 3 and pump revolution speed controller 9, it becomes possible according to the present invention to automatically regulate the quantity of the caramelized liquid to be fed out of the caramelizing tank 2 when the quantity of the liquid fed into the caramelizing tank 2 has changed according to the variations of processes subsequent to the cooling tank 10, and at the same time, to continuously carry out the automatic comtrol of keeping the degree of caramelization in a constant state at all times.

While specific embodiments of the invention have been shown and described in detail to illustrate the application of the principles of the invention, it will be understood that the invention may be embodied otherwise without departing from such principles.

What is claimed is:

1. A method of automatically controlling the degree of caramelization of liquid for candy in a caramelizing process in which boiled-down liquid is fed from a cooker, is stirred and caramelized in a caramelizing tank and thus a formed caramelized liquid is fed to a cooling tank, comprising, detecting the degree of caramelization with a caramelizing detector provided adjacent the cooling tank; and, according to the detected value of caramelization, controlling the speed of a stirring device disposed within the caramelizing tank.

2. A method according to claim 1, wherein said detection of the degree of caramelization is carried out by causing light to be reflected from a surface of the caramelized liquid in the cooling tank, dividing the light into its continuous spectrum, selecting a first spectral band of light from said continuous spectrum at a selected area of said spectrum, selecting a second spectral band of light from said spectrum at an area on said spectrum spaced from said first spectral band, converting the first and second bands into electric signals and deriving a value of caramelization therefrom, comparing the value to set upper and lower values for caramelization, and forming a control signal for controlling the speed of the stirring device when the detected value of caramelization falls above and below the set value.

3. A method as claimed in claim 1, wherein the quantity of the caramelized liquid to be fed to the cooling tank is so regulated as to be maintained at a liquid level which rises and falls depending on the control of the speed of the stirring device in the caramelizing tank, the levels being set as datum levels at each time of rising and falling of the liquid level.

4. An apparatus for controlling the degree of caramelization of candy comprising; cooker means for preparing a boiled-down caramelizing liquid, a caramelizing tank connected to receive said boiled-down liquid from said cooker, a stirrer in said caramelizing tank for stirring said boiled-down liquid to effect caramelization thereof, a variable speed motor connected to said stirrer to rotate said stirrer at selected speeds, control means for controlling the speed of said motor, a cooling tank connected to said caramelizing tank, means for pumping caramelizing liquid from said caramelizing tank to said cooling tank, means for measuring the level of liquid in said caramelizing tank, a caramelizing detector disposed adjacent said cooling tank in a position for detecting the caramelized liquid passed from said caramelizing tank to said cooling tank and connected to said means for pumping caramelized liquid from said caramelizing tank to said cooling tank for varying the speed of pumping thereof in accordance with the caramelization of the liquid.

5. An apparatus according to claim 4, including a caramelizing controller connected to said control means for said variable speed motor and to said means for pumping caramelized liquid from said caramelizing tank to said cooling tank for varying both the amount of stirring and the amount of caramelized liquid which is transferred in accordance with the caramelization detected at said cooling tank.

* * * * *